United States Patent
Berberich et al.

(10) Patent No.: US 9,345,260 B2
(45) Date of Patent: May 24, 2016

(54) PRODUCTION OF NON-ALCOHOLIC BEVERAGES BY FERMENTATION

(75) Inventors: Markus Berberich, Altefahr (DE); Frank Lucas, Stralsund (DE); Christoph Puttnies, Stralsund (DE); Oliver Nordmann, Altefahr (DE)

(73) Assignee: FINE FOOD & BEVERAGES GMBH, Stralsund (DE)

( * ) Notice: Subject to any disclaimer, the term of this patent is extended or adjusted under 35 U.S.C. 154(b) by 1189 days.

(21) Appl. No.: 13/266,864

(22) PCT Filed: Apr. 30, 2010

(86) PCT No.: PCT/EP2010/055927
§ 371 (c)(1),
(2), (4) Date: Sep. 13, 2012

(87) PCT Pub. No.: WO2010/125193
PCT Pub. Date: Nov. 4, 2010

(65) Prior Publication Data
US 2012/0328734 A1 Dec. 27, 2012

(30) Foreign Application Priority Data
Apr. 30, 2009 (DE) .......................... 10 2009 019 525

(51) Int. Cl.
*A23L 2/38* (2006.01)
*A23L 2/385* (2006.01)
*A23L 2/02* (2006.01)

(52) U.S. Cl.
CPC . *A23L 2/382* (2013.01); *A23L 2/02* (2013.01); *A23L 2/385* (2013.01)

(58) Field of Classification Search
CPC ............ A23L 2/52; A23L 1/105; A23L 2/60; A23L 2/02; A23L 2/39; A23L 2/38; A23L 2/382; A23L 2/56; A23L 2/385
USPC .......... 426/11, 12, 13, 16, 18, 29, 330.3, 590, 426/618
See application file for complete search history.

(56) References Cited

FOREIGN PATENT DOCUMENTS

| DE | 3706303 A1 * | 11/1988 |
|---|---|---|
| DE | 4 316 944 | 11/1994 |
| DE | 43 16 944 A1 | 11/1994 |
| DE | 20 2006 004 209 U1 | 2/2007 |
| EP | 0 199 105 | 10/1986 |
| EP | 0 199 105 A1 | 10/1986 |
| EP | 0 355 495 | 2/1990 |
| EP | 0 355 495 A2 | 2/1990 |
| EP | 0 544 643 A1 | 6/1993 |
| EP | 0 930 359 A2 | 7/1999 |
| EP | 0930359 A2 * | 7/1999 |
| GB | 1184032 A * | 3/1970 |
| GB | 2092878 A * | 8/1982 |
| JP | 51067756 A * | 6/1976 |
| JP | 51110075 A * | 9/1976 |
| JP | 59220152 A * | 12/1984 |
| JP | 59220153 A * | 12/1984 |
| JP | 2001-000157 A | 1/2001 |
| JP | 2004-201604 A | 7/2004 |
| SU | 1450814 A * | 1/1989 |
| WO | WO 95/22911 A1 | 8/1995 |

OTHER PUBLICATIONS

Wyeast Laboratories : Commercial : Breweries : Technical Information : Wild Beer Brew . . . http://www.wyeastlab.com/com-lambic-brewing.cfm Aug. 27, 2008.*
English Translation of L.G. Fleischer et al., "Entwicklung Funktioneller Milchsauer Fermentierter Getranke Auf Cerealer Basis", Brauerei-Forum 2004 (7) pp. 173-175.
Engllish Translation of L.G. Fleischer et al., "Entwicklung Funktioneller Milchsauer Fermentierter Getranke Auf Cerealer Basis", Brauerei-Forum 2004 (6) pp. 151-153.
English Translation of W. Back, "Erfrischung, GenuB und Gesundheit: Zukunftsorientierte Alkoholfreie Getranke auf Basis Spezieller Milchsauregarungen", Getrankeindustrie (5) 1999 pp. 289-293.
English Translation of S. Kreisz, "Der etwas andere Drink: Alkoholfreie Getranke auf Basis vermalzter Zerealien und Pseudozerealien", Getrankeindustrie (10) 2005 pp. 8-12.
English Translation of EP-0 355 495, Publication Date: Feb. 28, 1990.
English Translation of EP-0 199 105, Publication Date: Oct. 29, 1986.
English Translation of DE-4 4316 944, Publication Date: Nov. 24, 1994.
International Search Report of PCT/EP2010/055927 (Jul. 7, 2010).

(Continued)

*Primary Examiner* — Vera Stulii
(74) *Attorney, Agent, or Firm* — Millen White Zelano and Branigan, PC; Csaba Henter; Anthony Zelano

(57) ABSTRACT

The present invention relates to a method for producing a nonalcoholic beverage by fermentation, comprising the following steps: (a) providing a providing a macerated cereal extract, (b) producing a wort from the cereal extract, (c) treating the wort from step (b) with *Lactobacillus* microorganisms in order to obtain a sour wort, (d) mixing the sour wort from step (c) with a liquid containing sugar and treating the mixture with *Lactobacillus* microorganisms in order to obtain a fermented beverage, (e) heating the fermented beverage obtained from step (d) and then cooling said fermented beverage, (f) mixing the beverage, and (g) performing further treatment steps for stabilizing, clarifying, and completing the beverage.

29 Claims, No Drawings

(56) References Cited

OTHER PUBLICATIONS

D. Charalampopoulos et al., "Growth Studies of Potentially Probiotic Lactic Acid Bacteria in Cereal-Based Substrates", Journal of Applied Microbiology, vol. 92, No. 5 (2002) pp. 851-859.

L.G. Fleischer et al., "Entwicklung Funktioneller Milchsauer Fermentierter Getranke Auf Cerealer Basis", Brauerei-Forum 2004 (7) pp. 173-175.

L.G. Fleischer et al., "Entwicklung Funktioneller Milchsauer Fermentierter Getranke Auf Cerealer Basis", Brauerei-Forum 2004 (6) pp. 151-153.

W. Back, "Erfrischung, GenuB und Gesundheit: Zukunftsorientierte Alkoholfreie Getranke auf Basis Spezieller Milchsauregarungen", Getrankeindustrie (5) 1999 pp. 289-293.

S. Kreisz, "Der etwas andere Drink: Alkoholfreie Getranke auf Basis vermalzter Zerealien und Pseudozerealien", Getrankeindustrie (10) 2005 pp. 8-12.

A. Blandino et al., "Cereal-Based Fermented Foods and Beverages", Food Research International, vol. 36, No. 6 (2003) pp. 527-543.

Internet Document: Das Reinheitsgebot Sichert Seit Fast 500 Jahren Die Bier-Qualitat, http://www.brauer-bund.de/bier-ist-rein/reinheitsgebot.html, Oct. 25, 2011.

\* cited by examiner

PRODUCTION OF NON-ALCOHOLIC BEVERAGES BY FERMENTATION

The present invention relates to a method for producing non-alcoholic beverages by fermentation, preferably using organic (certified organic) raw materials.

WO 95/22911 describes a method for producing a non-alcoholic soft beverage using a microorganism which converts glucose into gluconic acid. A disadvantage of this method is that sugar has to be added to the resultant beverage, in particular sucrose, and the pH value has to be adjusted by addition of inorganic salts such as calcium and magnesium carbonate.

EP-A-0 930 359 likewise relates to a method of producing a beverage by fermentation, wherein a starting material containing a cereal extract is subjected to a two-stage fermentative treatment, the first stage comprising treatment with lactobacillus and yeast or yeast lysate and the second stage comprising treatment with an *acetobacter*. In this case too sugar has to be added to the product and the pH value adjusted by the addition of calcium and magnesium carbonate.

DE 10 2008 036 851.2 relates to a method in which a wort is produced from a macerated cereal extract and said wort is treated with *lactobacillus* to obtain a lactic wort. After heating the lactic wort, the latter is treated with yeast or yeast lysate, to obtain a malt base. This is then blended with fruit juice, without the addition of sugar or inorganic salts.

The object underlying the invention consists in developing a simplified production method for producing non-alcoholic beverages by fermentation, in particular non-alcoholic fruit juice and cola beverages, in which the disadvantages of earlier methods may be largely avoided or the effort involved in production may be significantly reduced. The objective of the method is extensive fermentation of all the beverage components.

The invention provides a method of producing by fermentation a non-alcoholic soft beverage, for example on a fruit juice basis or on the basis of thick agave juice and roasted malt beer, comprising the steps:
(a) providing a macerated cereal extract,
(b) producing a wort from the cereal extract,
(c) treating the wort from step (b) with lactobacillus microorganisms, to obtain a lactic wort, hereinafter sour wort,
(d) blending the sour wort from step (c) with a liquid containing sugar, in particular comprising the admixture of fruit juice, the admixture of fruit juice concentrate or the admixture of thick agave juice and roasted malt beer, and treating the mixture with *lactobacillus* microorganisms, to obtain a fermented beverage,
(e) heating the fermented beverage from (d) until fermentation stops, stripping unwanted flavours, sterilising and subsequent cooling,
(f) blending the beverage, in particular comprising the admixture of flavours, carbonic acid, and optionally water and
(g) performing further treatment steps to stabilise, clarify and finish the beverage.

The invention also provides the production of a concentrate for a non-alcoholic soft beverage for example based on fruit juice or based on thick agave juice and roasted malt beer, comprising the steps:
(a) providing a macerated cereal extract,
(b) producing a wort from the cereal extract,
(c) treating the wort from step (b) with lactobacillus microorganisms, to obtain a lactic wort, hereinafter sour wort,
(d) blending the sour wort from step (c) with a liquid containing sugar, in particular comprising the admixture of fruit juice, the admixture of fruit juice concentrate or the admixture of thick agave juice and roasted malt beer, and treating the mixture with *lactobacillus* microorganisms, to obtain a fermented beverage,
(e) heating the fermented beverage from (d) until fermentation stops, stripping unwanted flavours, sterilising and subsequent cooling,
(h) extracting water from the fermented beverage, for example to leave a proportion of dry solids of 45-85%, preferably of 50-60% relative to the total weight of the resultant concentrate, optionally after stabilisation and treatment.

The method according to the invention contains a plurality of preferred features, which achieve a particularly advantageous effect individually or in combination:

These features are as follows:
using a mixture of wheat and barley malt, a mixture of melanoidin and barley malt or of barley malt alone as starting material,
using a multi-step mash procedure,
performing a single-stage fermentation process with *lactobacillus* microorganisms to obtain the sour wort,
mixing the sour wort with fruit juice, fruit juice concentrate or thick agave juice and roasted malt beer preferably with the addition of water and subsequent fermentation of these mixtures with *lactobacillus* microorganisms,
heating the fermented beverage mixture to remove unwanted flavour substances and to stop fermentation,
cooling the heated mixture in stages,
adding the flavour components, carbonic acid and optionally water,
stabilising the beverage by a multistage, in particular four-stage separation procedure,
using only organic raw materials, in particular raw materials of certified organic quality.

The present invention relates to the production of non-alcoholic beverages, preferably non-alcoholic soft beverages based on fruit juice and non-alcoholic cola beverages based on thick agave juice and roasted malt beer. The alcohol content of the resultant beverages is in general <1.2 vol. %, preferably <0.5 vol. %. The beverages are produced using only organic (certified organic) raw materials, for example raw materials according to EC organic regulations. Furthermore, in a preferred embodiment sour wort is produced for the beverages in compliance with the German Beer Purity Law, i.e. only malt, water and fermenting microorganisms are used as additives. In other embodiments, however, the method according to the invention may relate to industrial modifications of the preferred mode of production.

Step (a) of the method comprises the provision of a macerated cereal extract. The starting material used for this purpose is preferably organic quality malt. The starting material preferably comprises barley malt, optionally combined with other types of malt.

For example, a mixture of barley malt and melanoidin malt, for example in a proportion of melanoidin malt of 1-10 wt. %, preferably 1-3 wt. %, may be used. Alternatively, a mixture of wheat and barley malt, in particular of organic quality, is used. The wheat content preferably comprises 40-75 wt. %, for example approx. 60-70 wt. %. The malts are conventionally subjected to a maceration process, for example milling, and then mixed with water, in particular brewing water. Instead of the malts, however, finished sugar products, for example glucose syrup or invert sugar, may also be used, optionally with malt solutions, whereby the subsequent mashing procedure may be simplified or avoided.

According to step (b) a wort is produced from the macerated cereal extract. Preferably, step (b) comprises a mash procedure, in particular a multi-step mash procedure. The macerated cereal extract is here subjected to a decoction mash process with the objective of achieving intensive natural maceration of the starch and polysaccharides.

The mash procedure is preferably performed for a period of 1-6 h, for example of approx. 1.5 h, and a temperature range of 30-80° C., preferably at 60-78° C., under atmospheric conditions. The mash procedure favourably comprises continuous steeping, preferably performed once or twice, and re-admixture of partial mashes. Constantly repeated supply and stirring in of cold, freshly mashed crushed malt solution may additionally optionally be performed. Natural breakdown of starch to glucose and optimum action of the natural malt enzymes are thus achieved in accordance with the German Beer Purity Law. The resultant glucose has a greater sweetening power than the maltose otherwise predominantly present in mash, so achieving an advantageous effect in flavour terms in the finished beverage.

In one industrial embodiment of the method, the malt wort may be combined with industrial enzymes which break down starch and sugar. This does not comply with the German Beer Purity Law, but does allow the method to be significantly shortened and simplified.

Furthermore, step (b) preferably comprises the separation of solids to produce a clear first wort run-off. To this end, the mash is filtered for example in a "lauter tun" or another device, for example a mash filter, i.e. the solids are separated from the liquid. In the process, a first wort run-off is obtained with an original gravity of favourably 6-25%, preferably 10-22%, for example approx. 19-21%, which is preferably diluted to 13-14% with cold water. The first wort run-off is preferably very bright, i.e. it has a turbidity of preferably below 5 EBC units and favourably a glucose content of 0.5-1.5 wt. % and/or a weight ratio of glucose to maltose of 1:4 to 1:15. It is to be expected that a mash of barley and melanoidin malt without wheat malt will result in a somewhat lower glucose content.

The resultant and optionally diluted first wort run-off is adjusted to a temperature of approx. 35-55° C., preferably to approx. 40-50° C.

The resultant liquid wort is treated according to step (c) of the method with *lactobacillus* microorganisms. The lactobacilli, preferably *Lactobacillus delbrueckii*, are added to the wort by inoculation, preferably in a concentration of 3-20 wt. %., preferably approx. 6-14 wt. %. Lactic acid fermentation of the wort then takes place preferably over a period of 48-72 h, at a temperature of 35-55° C., in particular of 45-48° C. Lactic acid fermentation is preferably performed to a lactic acid content of 0.6-1.2 wt. %, preferably 0.8-1.0 wt. %, and "sour wort" is obtained.

Step (d) of the method according to the invention comprises blending the sour wort, wherein the sour wort is diluted with a liquid containing sugar, for example a juice, syrup, concentrate or nectar from fruits or other plant materials, for example agave, optionally with addition of roasted malt beer. Liquids are preferably used which contain only naturally present sugars, for example fruit sugars, and are free of added sugar. A fruit juice consisting of fruit juice concentrate and water without added sugar may for example be used. A concentration of sour wort of 0.5-15 wt. % is preferably established in the process, particularly preferably of 1-10 wt. %. If necessary, water and/or another component, for example roasted malt beer, may also be added during blending. Lactic acid fermentation then preferably proceeds to a lactic acid content of 0.05-0.6 wt. % (lactic acid content calculated as citric acid with a factor of 0.64 on titration of 10 ml with 0.1 N NaOH).

According to a first preferred embodiment, to obtain non-alcoholic soft beverages based on fruit juice in step (d) 1-10 wt. % or 1-5 wt. %, preferably approx. 2.5-5 wt. % or 1.5-2.5 wt. % of the sour wort from step (c) are mixed with different fruit juices depending on the desired flavour of the final product, preferably organic fruit juices, for example grape and/or apple juices and optionally with water, preferably brewing water. Fruit juices of a Brix value of 6-20 and a filtration level of <15 NTU (=turbidity) are preferably used.

The mixture is favourably fermented for a period of 5-72 h, preferably 12-48 h, at a temperature of 35-55° C., in particular of 45-48° C., with the lactobacilli of the sour wort. This lactic acid fermentation is preferably performed up to a lactic acid content of 0.05-0.4 wt. %, preferably of 0.2-0.3 wt. % (calculated as citric acid as stated above).

In one industrial embodiment of the method, in order to increase capacity, the above-described mixing may also proceed without addition of water and with only a proportion of the added fruit juice. The mixture is then favourably fermented for a period of 5-170 h, preferably of 12-72 h, at a temperature of 35-55° C., in particular of 45-48° C. This lactic acid fermentation is favourably performed up to a lactic acid content of 0.1-0.55 wt. %, preferably of 0.1-0.36 wt. % (calculated as citric acid, see above). The remaining fruit juice is then mixed into the mixture before the following boiling step (e) and the necessary water is mixed in a storage tank in step (f) and/or in a pressure tank in step (g).

According to a further preferred embodiment, in step (d) 1-10 wt. % preferably approx. 4-6 wt. %, of the sour wort from step (c) is combined with thick agave juice and roasted malt beer to obtain non-alcoholic cola beverages. The thick agave juice used is preferably organic thick agave juice consisting of 100% agave, certified at least according to the EU organic certification regulation. Thick agave juice with a Brix value of 60-90° (%TSS) is preferably used, preferably with at least 75° Brix and a fructose/glucose ratio of 70-80:30-20.

An organically brewed beer consisting of roasted barley malt with a Brix value of 40-60 wt. % extract, preferably 43-57 wt. %, and a colour value of 8,000-8,600 EBC units is preferably used as the roasted malt beer. As an alternative to using finished roasted malt beer, roasted barley malt, preferably of organic quality, may also be added to the cereal extract of step (a).

Dextrose or (organic) sugar syrup may also be used instead of thick agave juice and/or (organic) caramel colouring or (organic) caramel may also be used instead of roasted malt beer.

The mixture is favourably fermented for a period of 5-72 h, preferably 36-56 h, at a temperature of 35-55° C., in particular of 45-48° C., with the lactobacilli of the sour wort. This lactic acid fermentation is preferably performed up to a lactic acid content of 0.05-0.3 wt. %, preferably of 0.1-0.18 wt. % (calculated as citric acid as stated above).

In one industrial embodiment of the method, in order to increase capacity, the above-described mixing may proceed with just a proportion of thick agave juice, water and roasted malt beer. The mixture is then favourably fermented for a period of 5-170 h, preferably 12-72 h, at a temperature of 35-55° C., in particular of 45-48° C. This lactic acid fermentation is favourably performed up to a lactic acid content of 0.1-0.4 wt. %, preferably of 0.1-0.25 wt. % (calculated as citric acid as stated above). The remaining thick agave juice and the remaining roasted malt beer is then added to the mixture before the following boiling step (e) and the necessary water is mixed in a storage tank in step (f) and/or in a pressure tank in step (g).

According to step (e), the fermented mixture is heated once the desired lactic acid content is reached, preferably at a temperature of 99-105° C. for a period of 3-20 min, and a pressure of 0-0.2 bar, preferably for a period of 5-8 min at atmospheric pressure and with an open vapour vent. The fermentation process is this stopped, unwanted flavours, particularly originating from fermentation, are evaporated and the batch is sterilised.

The boiled batch is then cooled to 1-5° C. optionally in a plurality of steps, preferably in two steps, initially directly after boiling to 8-12° C., for example to 8-9° C., and after recirculation into the storage tank in a second step to 1-2° C. or during recirculation into the storage tank via cooling devices, for example deep coolers in a second step to 1-2° C.

The cooled fermented fruit juice-containing soft or cola beverage may then be intermediately stored, for example in a storage tank at approx. 1° C. and at a pressure of approx. 0-0.5 bar, until the blending according to step (f) and the finishing according to step (g).

The result is a base material for producing a soft beverage, which has not yet been combined with flavour and $CO_2$ and contains turbid substances. The base material contains 0.5-15 wt. %, preferably 1-10 wt. %, sour wort. Furthermore, the base material preferably comprises a proportion of 0.1-0.8 wt. %, preferably of 0.1-0.5 wt. % lactic acid (calculated as citric acid as stated above). The base material is preferably free of residues of yeast organisms and/or residues of gluconobacter organisms.

Step (f) of the method according to the invention comprises blending of the fermented batch to yield the finished beverage, preferably by adding the natural flavours, preferably of certified organic quality. This process step is preferably performed in a $CO_2$ atmosphere, for example in a suitable tank. The process preferably proceeds with deep cooling at 0-4° C., particularly preferably at approx. 1° C., and at a pressure of 1-2 bar.

This process step is preferably performed with intensive thorough mixing, such that the carbonic acid situated in the tank binds intensively in the beverage, wherein a finished beverage is obtained with very fine-beaded carbonic acid with contents of preferably 1-8 g carbonic acid per liter of beverage, particularly preferably 3.5-4 g/l for the non-alcoholic, fruit juice-based beverages and preferably 6.5-7.5 g/l for the non-alcoholic cola beverage. The carbonation applied in prior art methods involving the injection of carbonic acid prior to filling may preferably be omitted.

In the industrial embodiment of the method, in order to increase capacity, the quantity of water needed in each case for blending the finished beverage is added in this process step at this point and/or in the pressure tank in step (g).

A particular advantage of the technology according to the invention of full fermentation with direct carbonation of the beverage after cooling is that the introduction of oxygen is largely prevented. This considerably increases the oxidative stability of the beverage and thus the stability of its flavour and its microbial stability. The resultant beverages preferably have a stability of more than 10 hot days (storage for in each case 1 day at 0° C. followed by in each case 1 day at 40° C.).

Furthermore, turbidity-forming substances may also be precipitated out by the cold treatment. Continuous removal of these turbid substances from the storage or mixing tank likewise contributes to an increase in the physical stability of the finished beverages.

In a further industrial embodiment of the method, blending of the beverage proceeds by the addition of the natural flavours, preferably of certified organic quality, as early as during recirculation into the storage tank. Stabilisers, preferably silica sol, and carbonic acid, preferably natural source carbonic acid, may be added in the process.

Step (g) of the method according to the invention comprises further treatment steps for stabilising, clarifying and finishing the beverage. Step (g) preferably comprises a multistage separation and filtration procedure, which for example includes one or more of the following steps:
(i) optionally tank stabilisation with silica sol,
(ii) centrifugation,
(iii) coarse filtration, for example with diatomaceous earth as adaptive filtration step, optionally in conjunction with an addition of silica gel, preferably as an alternative to step (i), and
(iv) single or multistage, in particular two-stage fine filtration, for example microfiltration, by cartridge filter.

The beverage may then be pumped into a pressure tank for filling purposes.

Care should favourably be taken to ensure that step (g) is carried out under oxygen-depleted conditions, i.e. the penetration of further atmospheric oxygen should be avoided.

Subsequent filling may proceed using conventional methods and suitable installations. Care should preferably be taken to ensure that here too the penetration of atmospheric oxygen is avoided. It is moreover preferable for filling to proceed under aseptic conditions and/or in conjunction with subsequent pasteurisation, for example the application of 30-500, preferably approx. 400 pasteurisation units for fruit juice-based soft beverages and approx. 60 pasteurisation units for cola beverages.

In a modification of the above-described method, a concentrate of the non-alcoholic soft beverages may also be produced, which is storable and transportable. To this end, water is removed from the finished fermented beverage (e), preferably to yield a proportion of remaining dry solids of 45-85%, preferably of 50-60%, relative to the total weight of the concentrate, for example by using a concentration installation. This concentration step preferably takes place after stabilisation and treatment, for example as described in step (g). However, the measures described previously for step (f), in particular the addition of flavours and carbonic acid may in this case be omitted. Instead, these steps, i.e. blending with water and flavours and adding carbonic acid, may be carried out with the concentrate.

The beverage obtainable by the method according to the invention contains sour wort fermented by *lactobacilli* in a proportion of preferably 0.5-15 wt. %, particularly preferably 0.5-10 wt. %. The natural lactic acid thus supplied to the beverage prevents the otherwise widespread addition in non-alcoholic beverages of isolated, in particular artificial citric acid or other artificial additives, in particular substances critical to health (for example E270, E300, E330). The beverage is preferably free of residues of yeast organisms and/or of *gluconobacter* organisms.

The non-alcoholic fruit juice-based soft beverage obtainable by the method according to the invention preferably contains sour wort fermented by *lactobacilli* as described above in proportions of preferably 0.5-4.0 wt. %, particularly preferably 1.5-2.5 wt. % or of preferably 1.0-10 wt. %, particularly preferably 2.5-5.0 wt. %.

This beverage further contains fruit juice from fruit juice concentrate, for example grape, elder, apple, and/or orange juice concentrate, preferably in a proportion overall of 20-40 wt. %.

This beverage produced by the method according to the invention additionally contains fruit flavours, preferably exclusively certified organic natural flavours, in particular flavours from the eponymous fruits. Preferred flavour types are for example elder and grape, orange and ginger, red apple or lemon grass.

The carbohydrate content for a fruity soft beverage amounts preferably to 4-5 g/100 ml, particularly preferably approx. 4.4 g/100 ml. The proportion of fruit-specific sugar is preferably ≥80%. The beverage produced by the method according to the invention favourably contains 15-30 g/l glucose and 1-5 g/l maltose. The proportion of glucose in weight per cent is preferably 1.8-2.8%. The proportion of sucrose is favourably less than 2 g/l. The proportion of sucrose plus maltose is favourably less than 4 g/l.

The physical stability of the beverage is preferably more than 10 hot days (storage for in each case 1 day at 0° C. followed by in each case 1 day at 40° C.). This high stability is achieved by full fermentation and storage at 1° C. in a $CO_2$ atmosphere and optionally tank stabilisation and/or stabilisation by diatomaceous earth filtration.

It is moreover preferable for the resultant finished beverage to contain at most 1 mg/l, particularly preferably 0.1-0.2 mg/l of residual oxygen.

The total proportion of acid (calculated as citric acid) in the fruit juice-based beverage produced according to the invention is preferably 2.0-2.8 g/l. The proportion of lactic acid (enzymatically determined) is preferably 0.40-2.40 g/l. It is furthermore preferable for the beverage produced according to the invention to contain less than 0.5 g/l, preferably less than 0.25 g/l, of gluconic acid or gluconate and/or less than 1 g/l, preferably less than 0.5 g/l, of sucrose.

The non-alcoholic cola beverage produced by the method according to the invention on the basis of thick agave juice and roasted malt beer preferably contains fermented sour wort as described above in proportions of preferably 1-10 wt. %, particularly preferably 4-6 wt. %.

Furthermore, this beverage contains thick agave juice, preferably in a proportion of 10-20 wt. % overall and roasted malt beer, preferably in a proportion of 0.5-1.5 wt. %.

This beverage produced by the method according to the invention additionally contains fruit flavours, preferably exclusively certified organic natural flavours, in particular cola flavours.

The carbohydrate content of a cola beverage preferably amounts to 8.0-11.0 g/100 ml, particularly preferably approx. 10.0-10.4 g/100 ml or 9.0-9.4 g/100 ml. The acidity of the beverage has a pH value of 3.0-4.0, particularly preferably 3.1-3.4, resulting primarily from the lactic acid content in the finished beverage of 1.0-2.0 g/l (calculated as citric acid), particularly preferably of 1.4-1.6 g/l. The proportion of sucrose is favourably less than 2 g/l or less than 1 g/l. The proportion of sucrose plus maltose is favourably less than 6 g/l.

The physical stability of the beverage is preferably more than 10 hot days (storage for in each case 1 day at 0° C. followed by in each case 1 day at 40° C.). This high stability is achieved by full fermentation and storage at 1° C. in a $CO_2$ atmosphere and optionally tank stabilisation and/or stabilisation by diatomaceous earth filtration.

It is moreover preferable for the resultant finished beverage to contain at most 1 mg/l, particularly preferably 0.1-0.2 mg/l of residual oxygen.

It is additionally preferable for the resultant finished beverage to contain 6.5-7.5 g/l, particularly preferably 7.0 g/l, of carbonic acid.

It is furthermore preferable for the colour of the resultant finished cola beverage to have a colour intensity of 45-90 EBC units.

The proportion of lactic acid in the cola beverage produced according to the invention is preferably 1.4-1.6 g/l. It is furthermore preferable for the beverage produced according to the invention to contain less than 0.5 g/l, preferably less than 0.25 g/l, of gluconic acid or gluconate.

The present invention also provides a concentrate for a non-alcoholic soft beverage as described above. The concentrate is obtainable by a method according to steps (a)-(e) and (h). It comprises a residual proportion of dry solids of 45-85% relative to the total weight.

EXAMPLES

The non-alcoholic fruit juice-based beverages described in Examples 1-4 were produced according to the German Beer Purity Law using exclusively organic (certified organic) raw materials.

Example 1

Elder and Grape Soft Beverage

The following ingredients were used to produce the beverage:
mineral water
grape juice from grape juice concentrate (26 wt. %)
elder juice from elder juice concentrate (2 wt. %)
sour wort from barley malt (2 or 2.5 wt. %)
organic flavours
carbonic acid 100 ml of the beverage contain 5.7 g extract (calculated by way of the rel. density) and contain approx. 4.4 g of carbohydrates therein. The most significant carbohydrates are as follows:
sucrose (ASU L 31.00-12 mod., enzymatic)<0.5 g/l
maltose (ASU L 48.02.07-2 mod., enzymatic) 2.4 g/l
glucose (ASU L 31.00-12 mod., enzymatic) 20.7 g/l
fructose (ASU L 31.00-13 mod., enzymatic) 20.5 g/l Example 2

Red Apple Soft Beverage

The following ingredients were used to produce the beverage:
mineral water
apple juice from apple juice concentrate (38 wt. %)
elder juice from elder juice concentrate (1 wt. %)
sour wort from barley malt (2 or 2.5 wt. %)
organic flavours
carbonic acid 100 ml of the beverage contain 5.7 g extract (calculated by way of the rel. density), approx. 3.8 g of total sugar being contained therein. The most significant sugars are as follows:
sucrose (IFU No. 56 mod.) 1.9 g/l
maltose (ASU L 48.02.07-2, enzymatic) 1.9 g/l
glucose (IFU No. 55 mod.) 11.0 g/l
fructose (IFU No. 55 mod.) 23.6 g/l Example 3

Lemon Grass Soft Beverage

The following ingredients were used to produce the beverage:
mineral water
grape juice from grape juice concentrate (28 wt. %)

sour wort from barley malt (2 or 2.5 wt. %)
organic flavours
carbonic acid 100 ml of the beverage contain 5.5 g extract (calculated by way of the rel. density), approx. 4.4 g of total sugar being contained therein. The most significant sugars are as follows:
sucrose (IFU No. 56 mod.) 0.3 g/l
maltose (ASU L 48.02.07-2, enzymatic) 1.9 g/l
glucose (IFU No. 55 mod.) 20.9 g/l
fructose (IFU No. 55 mod.) 21.0 g/l Example 4

Orange and Ginger Soft Beverage

The following ingredients were used to produce the beverage:
mineral water
grape juice from grape juice concentrate (28 wt. %)
sour wort from barley malt (2 or 2.5 wt. %)
organic flavours
carbonic acid 100 ml of the beverage contain 5.2 g extract (calculated by way of the rel. density), approx. 4.5 g of total sugar being contained therein. The most significant sugars are as follows:
sucrose (IFU No. 56 mod.)<0.05 g/l
maltose (ASU L 48.02.07-2, enzymatic) 2.7 g/l
glucose (IFU No. 55 mod.) 20.6 g/l
fructose (IFU No. 55 mod.) 21.2 g/l The beverage described below in Example 5 was produced according to the German Beer Purity Law and, with the exception of the natural flavour, using only organic raw materials.

Example 5

Organic Cola

Ingredients:
mineral water
thick agave juice (13 wt. %)
sour wort from barley malt (3.5 or 5 wt. %)
roasted malt beer (1 wt. %)
natural cola flavour
carbonic acid 100 ml of the beverage contain 10.2 g extract (calculated by way of the rel. density), approx. 9.1 g of total sugar being contained therein. The most significant sugars are as follows:
sucrose (ASU L 31.00-13, mod., enzymatic) 0.05 g/l
maltose (ASU L 48.02.07-2, enzymatic) 5.4 g/l
glucose (SOP M294, enzymatic) 19.4 g/l
fructose (SOP M294, enzymatic) 62.9 g/l

We claim:

1. A method of producing a non-alcoholic soft beverage by fermentation, comprising the steps
   (a) providing a macerated cereal extract,
   (b) producing a wort from the cereal extract,
   (c) treating the wort from step (b) by performing a single-stage fermentation with only *lactobacillus* microorganisms to obtain a sour wort,
   (d) (1) blending the sour wort after fermentation from step (c) with a sugar-containing liquid, and
       (2) treating the blend of (d)(1) with only *lactobacillus* microorganisms to obtain a fermented non-alcoholic beverage,
   (e) heating the fermented non-alcoholic beverage resulting from step (d) and subsequent cooling,
   (f) blending the non-alcoholic beverage and
   (g) performing further treatment steps to stabilize, clarify and finish the non-alcoholic beverage,
and wherein the non-alcoholic beverage resulting from step (d) and/or the non-alcoholic beverage resulting from step (g) is free from residues of yeast organisms.

2. The method of claim 1, comprising employing solely organic or certified organic raw materials.

3. The method of claim 1, wherein the non-alcoholic beverage is produced only employing malt, water and fermenting microorganisms as additives.

4. The method of claim 1, wherein step (a) comprises providing (i) a mixture of wheat and barley malt, (ii) a mixture of melanoidin and barley malt, or (iii) barley malt.

5. The method of claim 1, wherein step (b) comprises a mash procedure.

6. The method of claim 5, wherein the mash procedure is performed for a period of 1-6 h in a temperature range of 30-80° C. at atmospheric pressure.

7. The method of claim 1, wherein step (b) comprises separation of solids to produce a first wort run-off.

8. The method of claim 7, wherein the first wort run-off exhibits an original gravity of 6-25%.

9. The method of claim 1, wherein step (c) proceeds until a lactic acid content of 0.6-1.2 wt. % is established.

10. The method of claim 1, wherein step (c) comprises treating the wort with *lactobacillus* organisms for 48-72 h at a temperature of 35-55° C.

11. The method of claim 1, wherein step (d) comprises dilution of the sour wort to a concentration of 0.5-15 wt. %.

12. The method of claim 1, wherein step (d) comprises the addition of juice, syrup, concentrate or nectar from fruits or other plant materials and optionally of roasted malt beer.

13. The method of claim 1, wherein step (d) comprises the addition of (i) fruit juice, (ii) fruit juice concentrate or (iii) thick agave juice and roasted malt beer.

14. The method of claim 1, wherein step (d) comprises fermentation to a lactic acid content of 0.05-0.6 wt. %.

15. The method of claim 1, wherein step (e) comprises heating and then multistage cooling.

16. The method of claim 1, wherein step (f) comprises an intensive and thorough mixing of the product, wherein a content of 1-8 g $CO_2$ per liter of non-alcoholic beverage is achieved.

17. The method of claim 1, wherein step (g) comprises a multistage separation and filtration procedure.

18. The method of claim 1, wherein step (g) is carried out under oxygen-depleted conditions.

19. A method for the production of a concentrate for a non-alcoholic soft beverage, comprising the steps
   (a) providing a macerated cereal extract,
   (b) producing a wort from the cereal extract,
   (c) treating the wort from step (b) by performing a single-stage fermentation with only *lactobacillus* microorganisms to obtain a sour wort,
   (d) (1) blending the sour wort after fermentation from step (c) with a sugar-containing liquid, and
       (2) treating the blend of (d)(1) with only *lactobacillus* microorganisms to obtain a fermented non-alcoholic beverage,
   (e) heating of the fermented non-alcoholic beverage from (d) and subsequent cooling and
   (h) extracting water from the fermented non-alcoholic beverage, optionally after stabilisation and treatment,
and wherein the non-alcoholic beverage resulting from step (d) is free from residues of yeast organisms.

20. The method of claim 19, wherein after step (h) the non-alcoholic beverage is blended.

21. The method of claim 4, wherein step (a) comprises providing (i) a mixture of wheat and barley malt with a wheat content of 40-75 wt. % or (ii) a mixture of melanoidin and barley malt, with a melanoidin content of 1-10 wt. %.

22. The method of claim 5, wherein the mash procedure is a multi-step mash procedure.

23. The method of claim 7, wherein step (b) comprises separation of solids to produce a first wort run-off, comprising achieving a turbidity of below 5 EBC units and a glucose content of 0.5-1.5 wt. % or a weight ratio of glucose to maltose of 1:4 to 1:15.

24. The method of claim 8, wherein the first wort run-off exhibits an original gravity of 10-22%.

25. The method of claim 10, wherein step (c) comprises treating the wort with *lactobacillus* organisms for 48-72 h at a temperature of 45-48° C.

26. The method of claim 17, wherein the multistage separation and filtration procedure includes the following steps:
 (i) optionally tank stabilisation with silica sol,
 (ii) centrifugation,
 (iii) coarse filtration, optionally with stabilising step, and
 (iv) single or multistage fine filtration.

27. The method of claim 19, wherein the non-alcoholic beverage is based on fruit juice or thick agave juice and roasted malt beer.

28. The method of claim 19, wherein step (h) comprises extracting water from the fermented non-alcoholic beverage to leave a proportion of dry solids of 45-85% relative to the total weight of the resultant concentrate.

29. The method of claim 19, wherein step (h) comprises extracting water from the fermented non-alcoholic beverage to leave a proportion of dry solids of 50-60% relative to the total weight of the resultant concentrate.

* * * * *